United States Patent
Srinivasan et al.

(10) Patent No.: US 6,552,158 B1
(45) Date of Patent: Apr. 22, 2003

(54) DIMENSIONALLY STABLE POLYCARBONATE ARTICLES

(75) Inventors: Veeraraghavan Srinivasan, Bangalore (IN); Dibakar Dhara, Bangalore (IN); Rein Mollerus Faber, Bergen op Zoom (NL); Gautam Chatterjee, Bangalore (IN); Jan Pleun Lens, Breda (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/064,348

(22) Filed: Jul. 3, 2002

(51) Int. Cl.$^7$ ................................. C08G 64/00
(52) U.S. Cl. ....................... 528/196; 528/198
(58) Field of Search .................. 528/196, 198

(56) References Cited

U.S. PATENT DOCUMENTS

| | | | |
|---|---|---|---|
| 4,217,438 A | 8/1980 | Brunelle et al. | ............ 528/202 |
| 5,480,959 A | 1/1996 | Schmidhauser | ............. 528/198 |
| 6,395,364 B1 * | 5/2002 | Davis et al. | ................ 428/64.1 |

FOREIGN PATENT DOCUMENTS

| | | | | |
|---|---|---|---|---|
| JP | 7003002 | 1/1995 | ........... C08G/64/30 |
| JP | 8198791 | 8/1996 | ........... C07C/39/17 |

* cited by examiner

*Primary Examiner*—Terressa M. Boykin

(57) ABSTRACT

The disclosure relates to articles using polycarbonates produced by a melt transesterification polymerization method using bis(hydroxyaryl)cyclohexanes. Such polycarbonates have suitable glass transition temperatures and outstanding dimensional stabilities, thus making them particularly useful for making articles possessing high temperature stability, particularly for use in optical articles such as high density optical data storage and recordable media.

9 Claims, No Drawings

DIMENSIONALLY STABLE POLYCARBONATE ARTICLES

BACKGROUND

The disclosure relates to articles fabricated from polycarbonates and methods of making these articles using the polycarbonates.

Polycarbonates are widely used in a variety of applications by virtue of their excellent physical properties, such as impact resistance, mechanical characteristics, transparency, and the like. Polycarbonates have been used extensively for optical media applications such as for data storage and retrieval. Bisphenol A (BPA) polycarbonate, by virtue of its low cost, good transparency, and mechanical properties has served as the substrate of choice for optical data storage media such as compact disks and digital versatile disks (DVD). However, the need to store greater amounts of information on individual disks has resulted in newer techniques for high-density data storage, based on multiple information layers and shorter wavelength lasers, such as. high density DVD (HDDVD), digital video recordable (DVR), DVD-recordable (DVD–R or DVD+R), and DVD-rewritable (DVD–RW or DVD+RW) formats. The transparent plastic layer that forms the non-interfering shielding on such optical media disks requires more demanding material specifications, such as high transparency, heat resistance, low water absorption, ductility, and fewer particulates that standard BPA homopolycarbonate cannot meet.

One of the properties that influences the efficacy of a given material for higher data storage density is the spacing between the pits and grooves on the substrate material. Since data is stored in these pits and grooves, the flatness of the disk is necessary to prevent loss of information. It is known that excessive moisture absorption can result in skewing of the disk or the film, which in turn leads to reduced reliability. This skewing, hereinafter referred to as dimensional stability, will result in data being stored or read inaccurately by the laser beam. Since the bulk of the disk is comprised of a polymer material, the flatness of the disk depends on the low water absorption of the polymeric material. Similarly, a film produced from BPA polycarbonate can exhibit warpage due to absorption of ambient moisture. The dimensional stability is a function of, among other factors, the amount of ambient moisture present as well as the rate of moisture absorption. In addition to possessing optimum dimensional stability, a satisfactory material for such advanced format optical disks should also exhibit optimum replication and cycle time vis-à-vis the conditions for manufacturing conventional optical disks, such as compact disks. In order to produce disks through, for example, injection molding, the polymer should also be easily processable, that is, exhibit good flow. Therefore, there is a continued need for developing new materials as suitable substrates that would serve these advanced data storage formats. Suitable materials for high-density storage formats should satisfactorily address the requirements of dimensional stability, in addition to replication and cycle time, without compromising on any of the other desirable characteristics that BPA homopolycarbonate already possesses.

Polycarbonates having high glass transition temperatures and enhanced resistance to thermal degradation are highly sought after materials by industries, particularly those serving the automotive, aircraft, and display devices markets. In the automotive industry, they may be used, for example, in the production of headlamp lenses, such as those for headlamps and fog lamps, which are becoming smaller in size and characterized by closer proximity of the lenses to the heat-generating source. Other automotive lighting applications of such polycarbonates include articles such as bezels used for headlamps and fog lamps. Another application of such polycarbonates is for producing transparent, high temperature-stable films that can, for example be utilized in display devices.

Polycarbonates can be manufactured by direct reaction of an aromatic dihydroxy compound, such as BPA with phosgene using the so-called interfacial method, or the transesterification method, also sometimes referred to as the melt method, which involves an ester exchange reaction between the aromatic dihydroxy compound and a carbonic acid diester, such as diphenyl carbonate. The melt process gives a polycarbonate which generally contains very low levels of inorganic impurities and particulates, and which exhibits outstanding stability under polymer processing conditions.

Japanese Kokai Patent Application 7-003002 discloses manufacture of polycarbonates from cyclic terpene containing polyhydric phenols of undisclosed structures. Japanese Kokai Patent Application 8-198791 discloses polycarbonates obtained by polymerization of 1,3- and 2,8-bis (hydroxyaryl)cyclohexane derivatives. However, the average weight molecular weights of the polycarbonates were below 10,000, and the glass transition temperatures reported were also relatively low making these polycarbonates inferior candidates for fabricating articles for applications, optical media applications and display devices.

BRIEF SUMMARY

Briefly, one embodiment of the disclosure is an optical disk comprising a polycarbonate layer, wherein the polycarbonate is produced using a bis(hydroxyaryl)cyclohexane selected from the group consisting of the formula:

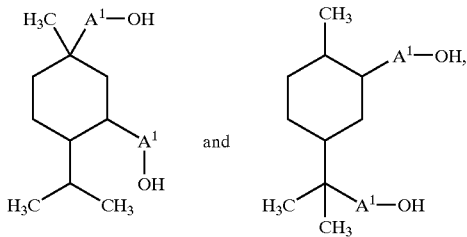

wherein each $A^1$ is independently a divalent substituted or unsubstituted radical; and at least one aromatic dihydroxy compound comonomer of the formula:

$$HO—A^2—OH,$$

wherein $A^2$ is selected from divalent substituted or unsubstituted aromatic radicals and, wherein the polycarbonate produced comprises a weight average molecular weight of at least about 10,000, a glass transition temperature of at least about 100° C., and a percentage elongation of less than about 0.025% relative to its initial length following exposure to nitrogen with a relative humidity of about 100%, at a temperature of about 23° C., and for a duration of about 3 hours.

Another embodiment is an article comprising a polycarbonate produced by using bisphenol composition comprising at least one bis(hydroxyaryl)cyclohexane selected from the group consisting of:

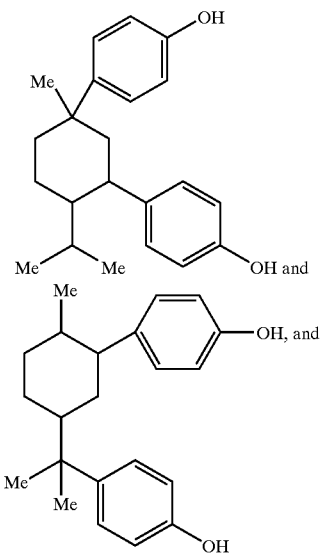

at least one aromatic dihydroxy compound comonomer having the formula:

HO—A²—OH, wherein A² is selected from divalent substituted or unsubstituted aromatic radicals.

In another embodiment, an optical disk comprises a polycarbonate layer produced using a catalyst composition and a monomer composition, wherein the monomer composition comprises a diphenyl carbonate; a bisphenol composition, and an aromatic dihydroxy comonomer compound, wherein the aromatic dihydroxy compound comprises resorcinol, bisphenol A, 4,4'-(1-decylidene)-bisphenol, 2,2-bis (3-sec-butyl-4-hydroxyphenyl)propane, and combinations comprising at least of the foregoing aromatic dihydroxy comonomer compounds, and wherein the bisphenol composition comprises at least one bis (hydroxyaryl)cyclohexane selected from the group consisting of:

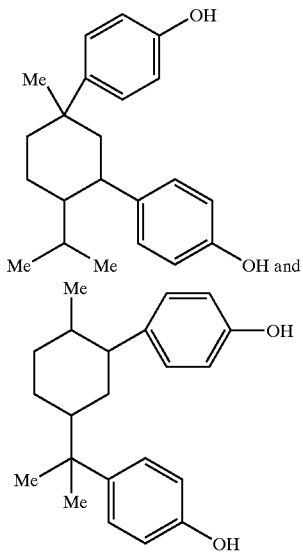

wherein each A¹ is independently a substituted or unsubstituted divalent aromatic radical.

A display device comprising a polycarbonate protective layer, wherein the polycarbonate is produced using a bis (hydroxyaryl)cyclohexane selected from the group consisting of the formula:

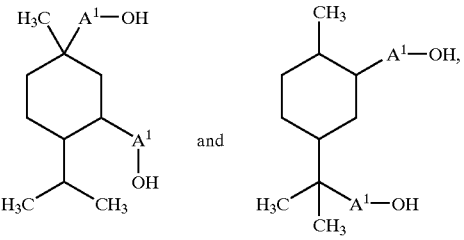

wherein each A¹ is independently a divalent substituted or unsubstituted radical; and at least one aromatic dihydroxy compound comonomer of the formula:

HO—A²—OH, wherein A² is selected from divalent substituted or unsubstituted aromatic radicals and, wherein the polycarbonate produced comprises a weight average molecular weight of at least about 10,000, a glass transition temperature of at least about 100° C., and a percentage elongation of less than about 0.025% relative to its initial length following exposure to nitrogen with a relative humidity of about 100%, at a temperature of about 23° C., and for a duration of about 3 hours.

The disclosure further relates to methods for making such articles from the above polycarbonates. The embodiments of the present disclosure have many advantages, including the ability to fabricate articles and films suitable for high heat, and optical data storage/retrieval applications.

DETAILED DESCRIPTION

In various embodiments, articles fabricated from polycarbonates are disclosed, wherein the polycarbonates are prepared using bis(hydroxyaryl)cyclohexanes and a method selected from the group consisting of melt transesterification polymerization, interfacial polymerization, interfacial conversion bischloroformate, solid state polymerization, and thin film melt polymerization.

In one embodiment, articles fabricated from the polycarbonates are produced by interfacial polymerization by using phosgene and a bisphenol composition comprising: i) at least one bisphenol selected from the group of bis (hydroxyaryl)cyclohexanes consisting of formulas (I), (II), and combinations comprising at least one of the bis (hydroxyaryl)cyclohexanes,

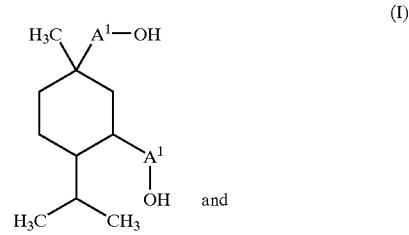

(I)

-continued

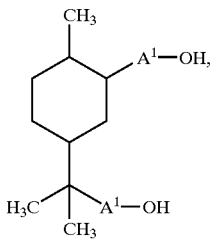
(II)

wherein each $A^1$ is independently a substituted or unsubstituted divalent aromatic radical; and optionally, at least one aromatic dihydroxy comonomer compound having the formula (III):

$$HO—A^2—OH, \quad (III)$$

wherein $A^2$ is selected from divalent substituted or unsubstituted aromatic radicals.

In some embodiments, $A^2$ has the structure of formula (IV):

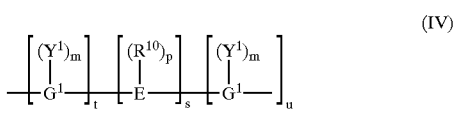
(IV)

wherein $G^1$ represents an aromatic group, such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc., and may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, such as sulfide, sulfoxide or sulfone; a phosphorus-containing linkage, such as phosphinyl, phosphonyl; an ether linkage; a carbonyl group, a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR; it being only necessary that $Y^1$ be inert to and unaffected by the reactants and reaction conditions used to prepare the polycarbonate. The letter m represents any integer from and including zero through the number of positions on $G^1$ available for substitution; p represents an integer from and including zero through the number of positions on E available for substitution; "t" represents an integer equal to at least one; "s" is either zero or one; and "u" represents any integer including zero.

In the aromatic dihydroxy comonomer compound (IV), when more than one $Y^1$ substituent is present, they may be the same or different. The same holds true for the $R^1$ substituent. When s is zero and u is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, wherein two or more ring carbon atoms of the hydrocarbon residue are substituted with $Y^1$ and hydroxyl groups. In some particular embodiments, the parameters "t", "s", and "u" are each one; both $G^1$ radicals are unsubstituted phenylene radicals; and E is an alkylidene group such as isopropylidene. In particular embodiments, both $A^1$ radicals are p-phenylene, although both may be o- or m-phenylene or one o- or m-phenylene and the other p-phenylene.

Some illustrative, non-limiting examples of suitable aromatic dihydroxy comonomer compounds include the dihydroxy-substituted aromatic hydrocarbons disclosed by name or formula (generic or specific) in U.S. Pat. No. 4,217,438. Some particular examples include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 2,2-bis(3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; and $C_{1-3}$ alkyl-substituted resorcinols.

Suitable aromatic dihydroxy comonomer compounds also include those containing indane structural units such as represented below by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol.

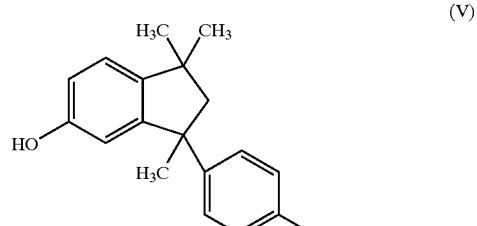
(V)

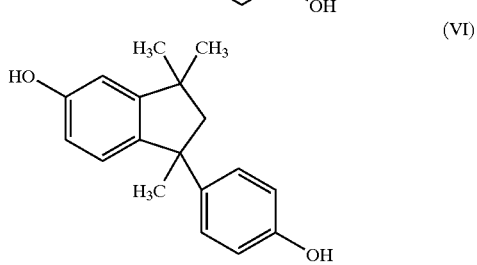
(VI)

Also included among suitable aromatic dihydroxy compound comonomers are the 2,2,2',2'-tetrahydro-1,1'-spirodiols having formula (VII):

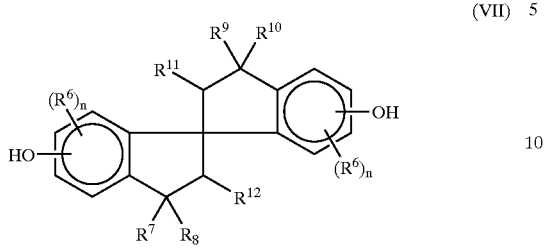

(VII)

wherein each $R^6$ is independently selected from monovalent hydrocarbon radicals halogen radicals, wherein each $R^7$, $R^8$, $R^9$, and $R^{10}$ is independently $C_{1-6}$ alkyl, wherein each $R^{11}$ and $R^{12}$ is independently H or $C_{1-6}$ alkyl, and wherein each n is independently selected from positive integers having a value of 0 to 3 inclusive. In a particular embodiment, the 2,2,2',2'-tetrahydro-1,1'-spiro-diol is 2,2,2',2'-tetrahydro-3,3,3',3'-tetramethyl-1,1'-spirobi[1H-indene]-6,6'-diol (sometimes known as "SBI").

In another embodiment, the disclosure describes articles fabricated from polycarbonates produced by a melt transesterification polymerization by using phosgene and the bis(hydroxyaryl)cyclohexanes previously described and shown in formulas (I) and (II).

In another embodiment, articles fabricated from polycarbonate are prepared by a polymerization method selected from the group consisting of melt transesterification polymerization, interfacial polymerization, interfacial conversion bischloroformate, solid state polymerization, and thin film melt polymerization, wherein the bisphenol composition comprises in addition to the bis(hydroxyaryl) cyclohexane of formulas (I) and (II), at least one aromatic dihydroxy compound comonomer of the formula (III):

wherein $A^2$ is selected from substituted or unsubstituted aromatic radicals.

In the interfacial polymerization method, an aromatic bisphenol is reacted with phosgene in a two-phase reaction medium, comprising an organic and a basic aqueous medium. The organic medium generally comprises a water-immiscible, halogen-containing hydrocarbon solvent, and the basic aqueous medium generally comprises an inorganic base dissolved in water. In general, a lower halogenated alkane, such as dichloromethane is used as the organic solvent. Alkali metal hydroxides, selected from the group consisting of lithium hydroxide, sodium hydroxide, and potassium hydroxide are generally used for to prepare the basic aqueous medium. The polycarbonates produced from the reaction are generally isolated from the organic solution by removal of the organic solvent.

In another embodiment, the articles are fabricated from polycarbonates prepared by a polymerization method selected from the group consisting of melt transesterification polymerization, interfacial polymerization, interfacial conversion bischloroformate, solid state polymerization, and thin film melt polymerization, and which uses the bis(hydroxyaryl)cyclohexanes with the formulas (VIII) and (IX):

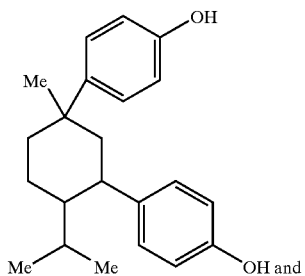

(VIII)

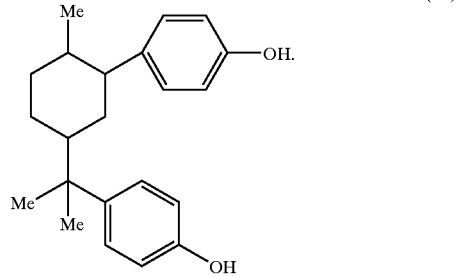

(IX)

The above bisphenols can be readily prepared using procedures described for example in U.S. Pat. No. 5,480,959.

In another embodiment, at least one aromatic dihydroxy compound comonomer of the general formula (III):

(III)

wherein $A^2$ is a substituted or unsubstituted, divalent aromatic radical; is optionally included in the bisphenol composition.

In another embodiment, carbonic esters as shown in Formula (X) are employed in the polymerization reaction,

(X)

wherein each Z is independently an unsubstituted or substituted alkyl radical, or an unsubstituted or substituted aryl radical. Substituents on Z, when present, may include, but are not limited to, one or more of alkyl, halogen, chloro, bromo, fluoro, nitro, alkoxy, alkoxycarbonyl, methoxycarbonyl, ethoxycarbonyl, and cyano. Some particular examples of the carbonic acid diester suitable for use in the present disclosure include diaryl carbonates, dialkyl carbonates and mixed aryl-alkyl carbonates such as diphenyl carbonate, bis(2,4-dichlorophenyl) carbonate, bis(2,4,5-trichlorophenyl)carbonate, bis(2-cyanophenyl)carbonate, bis(o-nitrophenyl)carbonate, bis{(2-methoxycarbonyl)phenyl}carbonate; bis{(2-ethoxycarbonyl)phenyl}carbonate; ditolyl carbonate, m-cresyl carbonate, dinaphthyl carbonate, bis(diphenyl)carbonate, diethyl carbonate, dimethyl carbonate, dibutyl carbonate and dicyclohexyl carbonate, and combinations of two or more thereof. Of these, diphenyl carbonate is often used in particular embodiments. In some embodiments, if two or more of these compounds are utilized, one is diphenyl carbonate.

In the transesterification melt polymerization, the bis(hydroxyaryl)cyclohexanes as shown in Formulas (I) and/or (II), the optional aromatic dihydroxy compound comonomers of Formula (III), and carbonic acid diesters of the Formula (X) are condensed in the presence of a suitable catalyst. Melt polymerization is accomplished in a process involving one or more stages. The one stage process comprises manufacturing polycarbonates by melt polycondensation of the above bis(hydroxyaryl)cyclohexanes, optional aromatic dihydroxy compound comonomers, and carbonic acid diesters (in the presence of the catalysts. The reactor employed for carrying out these polymerizations is not particularly critical; in some embodiments, it can be made from either glass or metal. In some embodiments, the reactor walls may be further passivated by treatment with a suitable acidic material. If it is desirable to carry out the polymerization in a glass reactor, soaking it in an aqueous acid medium passivates the walls of the reactor. In various embodiments, acids for this process include water solutions of mineral acids, such as hydrochloric acid, sulfuric acid, nitric acid, and the like, and organic acids, such as acetic acid, methanesulfonic acid, toluenesulfonic acid, and the like.

In various embodiments, reactants for the polymerization reaction can be charged into a reactor either in the solid form or in the molten form. Initial charging of reactants into a reactor and subsequent mixing of these materials under reactive conditions for the polymerization may be conducted in an inert atmosphere such as a nitrogen atmosphere. Mixing of the reaction mixture is accomplished by methods known in the art, such as by stirring. Reactive conditions in the present context generally refer to conditions comprising time, temperature, pressure and other factors which result in polymerization of the reactants.

The polymerization is conducted by subjecting the reaction mixture to a series of temperature-pressure-time protocols. This generally involves gradually raising the reaction temperature in stages while gradually lowering the pressure in stages. Preferably the pressure is varied from about atmospheric pressure at the start of the reaction to a value between about atmospheric pressure and about 0.01 millibar pressure; with between about atmospheric pressure and about 0.05 millibar pressure more preferred; and with between about 300 millibars pressure and about 0.05 millibar pressure even more preferred. The temperature is preferably varied between about the melting temperature of the reaction mixture and about 350° C., with between about 180° C. and about 230° C., more preferred, with between about 230° C. and about 270° C. even more preferred, and with between about 270° C. and about 350° C. most preferred. This procedure will generally ensure that the reactants react properly to produce polycarbonates with the desired molecular weight, glass transition temperature and physical properties. The reaction proceeds to build the polycarbonate chain with production of phenol by-product. Efficient removal of the phenol by-product by application of vacuum can produce polycarbonates of high molecular weight. If phenol is not removed efficiently, it may participate in the backward reaction whereby the polycarbonate chain is cleaved by phenol in the presence of the polymerization catalyst, thus leading to polycarbonate of lower molecular weight with inferior mechanical and other physical properties. The progress of the reaction may be monitored by measuring the melt viscosity or the weight average molecular weight of the reaction mixture. After the desired melt viscosity and/or molecular weight is reached, the final polycarbonate product may be isolated from the reactor in a solid or molten form.

The methods of producing the polycarbonates are not limited to what is described hereinabove. Thus, the process can be operated either in a batch, semi-batch or a continuous mode. Reaction apparatus known in the art may be used in conducting this reaction, and in some embodiments, may be a horizontal type, tube type, or column type.

The term "alkyl" as used in the various embodiments of the present disclosure is intended to designate straight chain alkyl, branched alkyl, aralkyl, cycloalkyl, and bicycloalkyl radicals. In various embodiments, straight chain and branched alkyl radicals, unless otherwise specified are those containing from 1 to about 40 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments, cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments, aralkyl radicals are those containing from 7 to about 14 carbon atoms; these include, but are not limited to, benzyl, phenylbutyl, phenylpropyl, and phenylethyl. In various embodiments, aromatic radicals used in the present disclosure are intended to designate monocyclic or polycyclic moieties containing from 6 to 12 ring carbon atoms. These aryl groups may also contain one or more halogen atoms or alkyl groups substituted on the ring carbons. In most embodiments, any substituent present is not in a ring position that would prevent an appropriate aromatic radical, such as in a phenolic aromatic radical, from reacting with an appropriate olefinic group, such as in a monoterpene. Some illustrative non-limiting examples of these aromatic radicals include phenyl, halophenyl, biphenyl, and naphthyl. In another embodiment, aromatic radicals used in the present disclosure are intended to designate aralkyl radicals containing from 7 to 14 carbon atoms.

In the preparation of the polycarbonates for forming the articles, the aromatic dihydroxy compound comonomers described above may be used alone, or as mixtures of two or more different aromatic dihydroxy compound comonomers. In one particular embodiment, suitable aromatic dihydroxy compound comonomers for the preparation of a polycarbonate are 2,2-bis(4-hydroxyphenyl)propane (commonly known as bisphenol A or "BPA"), resorcinol, or mixtures thereof.

During the manufacture of the polycarbonates by the melt transesterification method, the amount of the carbonic acid diesters is preferably, in an amount of about 0.95 to about 1.30 moles, with an amount of about 1.05 to about 1.15 moles, per 1 mole of the bisphenol component more preferred.

Catalysts that can be used for the melt transesterification polymerization include all those known to be effective for such polymerization. In various embodiments such catalysts are selected from the group consisting of alkali metal compounds; alkaline earth metal compounds, tetraorganoammonium compounds, and tetraorganophosphonium compounds.

Specific examples of alkali metal compounds or alkaline earth metal compounds include organic acid salts, inorganic acid salts, oxides, hydroxides, hydrides, and alcoholates of alkali metals and alkaline earth metals. In some embodiments, the catalyst is an alkali metal compound of the formula $M_1X_1$, wherein $M_1$ is selected from the group consisting of lithium, sodium, and potassium; and $X_1$ is selected from the group consisting of hydroxide and OAr, wherein Ar is a monovalent aromatic radical.

More specifically, examples of alkali metal compounds include, but are not limited to, sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, etc.

Furthermore, specific examples of alkaline earth metal compounds include, but are not limited to, calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, etc.

In other embodiments, the catalyst is a tetraorganoammonium compound of the formula $R_4NY^2$, wherein R is a $C_1$–$C_4$ alkyl group, and $Y^2$ is hydroxide, acetate, or OAr, wherein Ar is a monovalent aromatic radical. In still other embodiments, the catalyst is a tetraorganophosphonium compound of the formula $R_4PY^2$, wherein R is a $C_1$–$C_4$ alkyl group, and $Y^2$ is hydroxide, acetate, or OAr, wherein Ar is a monovalent aromatic radical.

Specific examples of tetraorganoammonium compounds and tetraorganophosphonium compounds include, but are not limited to tetramethylammonium hydroxide, tetrabutylammonium hydroxide, tetraethylphosphonium hydroxide, tetrabutylphosphonium acetate, tetrabutylphosphonium hydroxide, etc. Any of the catalysts disclosed above may be used as combinations of 2 or more substances. The catalyst may be added in a variety of forms. The catalyst may be added as a solid, for example a powder, or it may be dissolved in a solvent, for example water or alcohol.

The total catalyst composition is preferably about $1\times10^{-7}$ to about $2\times10^{-3}$ moles for each mole of the combination of the bisphenol composition and optional comonomer, and with about $1\times10^{-6}$ to about $4\times10^{-4}$ moles more preferred.

Polycarbonates prepared by the transesterification melt polymerization method preferably have a weight average molecular weight of at least about 10,000, a glass transition temperature of at least about 100° C., and a dimensional stability as measured by percentage elongation of less than about 0.025% relative to its initial length following exposure to nitrogen with a relative humidity of about 100%, at a temperature of about 23° C., and for a duration of about 3 hours.

When the transesterification melt polymerization is carried out in the same manner as described above, but without using aromatic dihydroxy compounds as comonomers, the resulting polycarbonate products have, in one embodiment, a weight average molecular weight of at least about 10,000, a glass transition temperature of at least about 150° C., and a dimensional stability of less than about 0.025% relative to its initial length following exposure to nitrogen with a relative humidity of about 100%, at a temperature of about 23° C., and for a duration of about 3 hours.

The polycarbonates prepared using any of the polymerization methods previously described can be cast into films by forming a solution of the polycarbonate in a solvent. Suitable solvents include, but are not limited to, halogenated hydrocarbon solvents, such as dichloromethane and 1,2-dichloroethane.

The dimensional stability of the polycarbonates can be measured by placing a polycarbonate film in a controlled chamber and exposing it to a stream of nitrogen maintained at a pre-determined level of humidity and temperature for a specified length of time. The absorption of moisture by the polycarbonate sample will cause the film to swell or elongate. The film is then de-swelled by driving the absorbed out using de-humidified heated nitrogen, and the process is generally repeated to arrive at the percent elongation. In one aspect of this method, the process described above can be repeated more than once, and in some embodiments, three times to arrive at the percent elongation. A low percent elongation is indicative of an outstanding resistance to moisture absorption, which translates to excellent dimensional stability.

Films cast from polycarbonate produced by the melt transesterification polymerization method, as described above, exhibit outstanding dimensional stability in a humid environment, as evidenced by the very low percent elongation of less than about 0.025% of the original length of the film. These materials exhibit much better dimensional stability compared to films made from the reference material, BPA homopolycarbonate and the comparative materials, the polycarbonate copolymer prepared from the interfacial reaction of a 45:55 mole ratio of the monomers, 1,1-bis(4-hydroxyphenyl)-3,3,5-trimethylcyclohexane and 4,4'-(m-phenylenediisopropylidene) diphenol, respectively, with phosgene, and the homopolycarbonate derived from reaction of dimethylbisphenol cyclohexanone (DMBPC) with diphenyl carbonate.

In some embodiments, the polycarbonate copolymers consist essentially of structural units derived from the said bis(hydroxyaryl)cyclohexanes or mixtures thereof in combination with structural units derived from a carbonic acid diester and structural units derived from at least one aromatic dihydroxy compound comonomer. In a particular embodiment, the polycarbonate copolymers consist essentially of structural units derived from the said bis(hydroxyaryl)cyclohexanes or mixtures thereof in combination with structural units derived from a carbonic acid diester and structural units derived from at least one of bisphenol A, resorcinol, 4,4'-(1-decylidene)-bisphenol, 2,2-bis(3-sec-butyl-4-hydroxyphenyl)propane or mixtures thereof. In still other embodiments, the polycarbonate copolymers consist of structural units derived from the said bis(hydroxyaryl)cyclohexanes or mixtures thereof in combination with structural units derived from a carbonic acid diester and structural units derived from at least one aromatic dihydroxy compound comonomer. In a particular embodiment, the polycarbonate copolymers consist of structural units derived from the said bis(hydroxyaryl)cyclohexanes or mixtures thereof in combination with structural units derived from a carbonic acid diester and structural units derived from at least one of bisphenol A, resorcinol, 4,4'-(1-decylidene)-bisphenol, 2,2-bis(3-sec-butyl-4-hydroxyphenyl)propane or mixtures thereof. The various structural possibilities that these comonomers can assume have already been described above. In other embodiments, the comonomers include BPA, resorcinol, 4,4'-(1-decylidene)-bisphenol (also referred to as "bispded"), and 2,2-bis(3-sec-butyl-4-hydroxyphenyl)propane (also referred to as "s-BPA"). In particular embodiments, aromatic dihydroxy compounds that can be used as comonomers include BPA and resorcinol.

Articles fabricated from polycarbonates prepared using the bis(hydroxyaryl)cyclohexanes by any of the methods-mentioned hereinabove are very useful in automotive lighting applications, such as for use as lenses and bezels for headlamps and fog lamps, and in display device applications, wherein high temperature stability may be critical for optimum long-term performance.

Articles comprising the polycarbonates prepared using the proper proportions of the bis(hydroxyaryl)cyclohexanes and the aromatic dihydroxy compound comonomer are used to make a variety of articles suitable for optical media applications. In various embodiments, the polycarbonates for making articles suitable for optical media applications comprise those in which the bis(hydroxyaryl)cyclohexane is at least one of those described herein, and the aromatic dihydroxy compound comonomer is at least one of BPA, resorcinol, bispded, and s-BPA. Articles that can be made include optical articles and display devices. Optical articles that can be prepared using the polycarbonates comprise a film, an optical data storage medium, a rewritable optical disk, and a substrate for an optical data storage medium. The optical articles can function as the protective, transparent layer that covers the various recording media, such as high-density data storage using digital versatile disc (DVD), high density DVD (HDDVD), digital video recordable (DVR), DVD-recordable (DVD–R or DVD+R), and DVD-rewritable (DVD–RW or DVD+RW) formats.

The polycarbonates prepared using any of the methods mentioned hereinabove are also suitable for use in making display devices. One of the components of a display device is the film that forms part of the display panel. The material requirements for such a film include good processability, high molecular weight, and a glass transition temperature sufficient to withstand the heat generated during the display. By a proper choice of the reacting monomer, polycarbonates having high molecular weight, high glass transition temperatures, and good processability can be obtained, thus making them useful to produce such films for the display devices. These films can be cast from solutions of the polycarbonates. Such films possess good processability, outstanding dimensional stability, and a glass transition temperature sufficient to withstand the heat generated during the display.

Another aspect of the present disclosure is a method for making an article that comprises molding a composition comprising the polycarbonates produced by the melt transesterification polymerization methods described above. The process for molding may be selected from the group consisting of injection molding, thermoforming, blow molding, and the like. In various embodiments, the polycarbonates for the molding composition comprise those in which the bis(hydroxyaryl)cyclohexane is at least one of those described herein.

The following examples are included to provide additional guidance to those skilled in the art in practicing the claimed disclosure. The examples provided are merely representative of the work that contributes to the teaching of the present application. Accordingly, these examples are not intended to limit the disclosure, as defined in the appended claims, in any manner.

EXAMPLES

In all the examples, the bis(hydroxyaryl)cyclohexanes (X) and (Y) represent the structures as shown below.

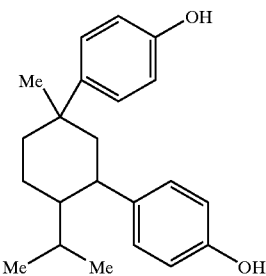
(X)

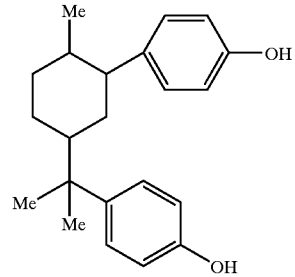
(Y)

Glass Transition Temperature of polycarbonates was measured by differential scanning calorimetry by heating the sample at the rate of 10° C. to 20° C. per minute under nitrogen.

Weight average molecular weight ($M_w$) and number average molecular weight ($M_n$) were measured by gel permeation chromatography. Values quoted are relative to those measured for polystyrene standard.

Polydispersity index (PDI) was calculated from the ratio, $M_w/M_n$.

Dimensional stability of the polycarbonate sample was measured by first casting a film from a solution of the polycarbonate in dichloromethane. The film was then placed in a chamber and subjected to a flow of nitrogen maintained at a relative humidity of 100% and 23° C. After a predetermined length of time, generally about 30 to about 45 minutes, the film was exposed to a stream of dry nitrogen gas flowing at the rate of about 150 to about 200 ml/minute to remove all absorbed moisture from the film. The above process was repeated three times and the final length of the film was measured. The percent elongation (increase in length) of the film relative to the initial length was then calculated.

$TD_{1/2}$, the half-life temperature, refers to the temperature at which half the amount of the polycarbonate decomposed. This was determined by thermogravimetric analysis by using a heating rate of 20° C./min under nitrogen.

The percent end-cap refers to the % of polycarbonate chains end-capped by phenyl group. This parameter was measured by using $^{31}P$ NMR spectroscopy.

The Fries level denotes the amount of species resulting from a Fries rearrangement of the polycarbonate chains. The values were obtained using a High Performance Liquid Chromatography (HPLC) technique, and are expressed in parts per million (ppm).

The catalyst composition in every example was prepared by taking appropriate aliquots of a stock solution of aqueous sodium hydroxide and a 25 weight percent aqueous tetramethylammonium hydroxide.-

General Procedure for Melt Transesterification Polymerization

A glass polymerization reactor was passivated by soaking the reactor in a bath containing 1 molar aqueous hydrochloric acid solution. After 24 hours, the reactor was thoroughly rinsed with demineralized water, and finally, with deionized water to ensure that all traces of acid and other contaminants were removed. The reactor was then thoroughly dried and charged with the appropriate amounts of the monomers comprising the bis(hydroxyaryl)cyclohexanes (I) or (II), or mixtures thereof, one or more aromatic dihydroxy compound comonomers, and diphenyl carbonate. The reactor was then mounted in a polymerization assembly and checked to ensure that no leaks were present. The required amount of the catalyst solution, as prepared above, was then introduced into the reactor using a syringe. The atmosphere inside the reactor was then evacuated using a vacuum source and purged with nitrogen. This cycle was repeated 3 times after which the contents of the reactor were heated to melt the monomer mixture. When the temperature of the mixture reached about 180° C., the stirrer in the reactor was turned on and adjusted to about 40 to about 80 revolutions per minute (rpm) to ensure that the entire solid mass fully melted, a process that usually took about 15 to about 20 minutes. Next, the reaction mixture was heated to about 230° C., while the pressure inside the reactor was adjusted to about 170 millibar using a vacuum source. This temperature-pressure-time regime was designated as P1. After stirring the reaction mass at this condition for about 1 hour, the reaction temperature was raised to about 270° C. while readjusting the pressure to around 20 millibar. After being maintained at this condition, designated as P2, for about 30 minutes, the temperature of the reaction mixture was raised to 300° C. while bringing the pressure down to about 1.5 millibar. After allowing the reaction to proceed under these conditions, designated as P3, for about 30 to about 60 minutes, the pressure inside the reactor was brought to atmospheric pressure and the reactor was vented to relieve any excess pressure. Product isolation was accomplished by breaking the glass nipple at the bottom of the reactor and collecting the material. In the cases where the product was of a very high molecular weight, the hot molten polymer was dropped down by pressurizing the reactor with nitrogen gas.

Examples 1–17, Comparative Examples 1–3

The general polymerization procedure described above was used to prepare a variety of polycarbonates using a variety of different monomer combinations. For each polycarbonate prepared, the glass transition temperature, molecular weight, and swell data were measured using the general procedures described above. The results are shown below in Table 1. All reactions were carried out using a mole ratio of diphenyl carbonate to combination of bis (hydroxyaryl)cyclohexane and aromatic dihydroxy compound comonomers of 1.08. The catalyst was a combination of sodium hydroxide and tetramethylammonium hydroxide taken in a mole ratio of 1:100, respectively. In each case, $2.5 \times 10^{-4}$ moles of tetramethylammonium hydroxide per mole of the bisphenol composition was taken. Values refer to the relative mole percent of the bis(hydroxyaryl) cyclohexane mixture and the aromatic dihydroxy compound comonomers. Comparative Example 1 (indicated as Comp. Ex. 1 in Table 1) refers to BPA homopolycarbonate made using BPA and diphenyl carbonate using the general procedure described above. Comparative Example 2 (indicated as Comp. Ex. 2 in Table 1) refers to the polycarbonate copolymer prepared from the interfacial reaction of a 45:55 mole ratio of the monomers, 1,1-bis(4-hydroxyphenyl)-3,3,5-trimethylcyclohexane and 4,4'-(m-phenylenediisopropylidene) diphenol, respectively, with phosgene. Comparative Example 3 (indicated as Comp. Ex. 3 in Table 1) refers to a polycarbonate made using dimethylbisphenol cyclohexanone and diphenyl carbonate using the general procedure described above.

TABLE 1

| Example | Mole % X | Mole % Y | Mole % Aromatic Dihydroxy compound comonomer | | | | $M_w$ ($\times 10^3$) | $M_n$ ($\times 10^3$) | Tg (° C.) | Swell (%) |
|---|---|---|---|---|---|---|---|---|---|---|
| | | | BPA | Resorcinol | Bispded | s-BPA | | | | |
| 1 | 56 | | 0 | 0 | 0 | 44 | 39.9 | 17.4 | 127 | ND |
| 2 | 75 | | 0 | 25 | 0 | 0 | 27.4 | 13.3 | 199 | ND |
| 3 | 50 | | 30 | 20 | 0 | 0 | 30.07 | 13.05 | 165 | ND |
| 4 | 50 | | 0 | 50 | 0 | 0 | 41.6 | 20.2 | ND | ND |
| 5 | 22 | | 70 | 0 | 0 | 8 | 59.5 | 21.1 | 159 | 0.052 |
| 6 | 34 | | 50 | 0 | 0 | 16 | 64.6 | 24.3 | 149 | 0.035 |
| 7 | 24 | | 70 | 0 | 6 | 0 | 45.8 | 45.9 | 150 | 0.044 |
| 8 | 68 | | 0 | 0 | 32 | 0 | 36.4 | 14.8 | 142 | 0.027 |
| 9 | 62 | | 0 | 0 | 0 | 38 | 35.3 | 15.2 | 135 | 0.020 |
| 10 | 55 | | 0 | 0 | 45 | 0 | 47.6 | 17.9 | 116 | 0.013 |
| 11 | 55 | | 0 | 0 | 0 | 45 | 35.8 | 15.04 | 121 | 0.013 |
| 12 | 70 | | 0 | 0 | 0 | 30 | 38.8 | 16.8 | 151 | 0.018 |
| 13 | 56 | | 11 | 0 | 33 | 0 | 47.2 | 17.8 | 133 | 0.019 |
| 14 | 100 | 0 | 0 | 0 | 0 | 0 | 34 | NA | 231 | 0.019 |
| 15 | 0 | 100 | 0 | 0 | 0 | 0 | 33 | NA | 187 | 0.013 |
| 16 | 60 | 40 | 0 | 0 | 0 | 0 | 31 | NA | 207 | 0.014 |
| 17 | 33 | 22 | 45 | 0 | 0 | 0 | 52 | NA | 191 | NA |
| Comp Ex 1 | NA | | NA | NA | NA | NA | 47.2 | 19.3 | 147 | 0.052 |
| Comp Ex 2 | NA | | NA | NA | NA | NA | NA | NA | NA | 0.024 |
| Comp Ex 3 | NA | | NA | NA | NA | NA | NA | NA | NA | 0.038 |

Examples 18–37

The general procedure was also used to prepare polycarbonates with higher glass transition temperatures, generally greater than 150° C. These results are shown in Table 2. The mole ratio denotes the ratio of moles of diphenyl carbonate to sum of mole of BPA, (X) and (Y). The catalyst was a combination of sodium hydroxide and tetramethylammonium hydroxide taken in a mole ratio of 1:100, respectively. In each case, $2.5 \times 10^{-4}$ moles of tetramethylammonium hydroxide per mole of the bisphenol composition was taken. Values represent moles of catalyst/mole of the bisphenol composition comprising (A), (X), and (Y). P3 time refers to reaction time at the last step of the polymerization process as described in the procedure above.

studied. These results are shown in Table 3. All polymerizations were carried out using BPA and (X) such that the mole fraction of each component was 0.5. The catalyst was a combination of sodium hydroxide and tetramethylammonium hydroxide taken in a mole ratio of 1:100, respectively. In each case, $2.5 \times 10^{-4}$ moles of tetramethylammonium hydroxide per mole of the bisphenol composition was taken. Values represent moles of catalyst/mole of combination of BPA and (X). P3 time has the same meaning as described above. Mole ratio denotes the ratio of moles of diphenyl carbonate to sum of moles of BPA and (X).

TABLE 2

| Ex. No. | Mole Fraction of monomers | | | Mole ratio | NaOH ($\times 10^{-6}$) moles | P3 time (min) | $M_w$ ($\times 10^3$) | $M_n$ ($\times 10^3$) | PDI | $T_g$ (° C.) | $TD_{1/2}$ (° C.) |
|---|---|---|---|---|---|---|---|---|---|---|---|
| | BPX | (X) | (Y) | | | | | | | | |
| 18 | 0 | 1.0 | 0 | 1.08 | 7.5 | 30 | 24 | 14.7 | 1.64 | 210 | 510 |
| 19 | 0 | 1.0 | 0 | 1.08 | 7.5 | 120 | 21.1 | 12.9 | 1.64 | 204 | 508 |
| 20 | 0.5 | 0 | 0.5 | 1.08 | 7.5 | 60 | 40.1 | 20.3 | 1.97 | 167 | 506 |
| 21 | 0 | 0 | 1 | 1.08 | 7.5 | 30 | 43.7 | 21.8 | 2.01 | 179 | 496 |
| 22 | 0.5 | 0.5 | 0 | 1.08 | 6.3 | 30 | 42 | 23.3 | 1.80 | 187 | 496 |
| 23 | 0.75 | 0.25 | 0 | 1.08 | 5.0 | 60 | 44.6 | 21.8 | 2.05 | 170 | 531 |
| 24 | 0.25 | 0.75 | 0 | 1.08 | 5.0 | 60 | 28 | 12.9 | 2.03 | 195 | 515 |
| 25 | 0 | 1.0 | 0 | 1.08 | 7.5 | 30 | 35.8 | 16.9 | 2.12 | 221 | 482 |
| 26 | 0.25 | 0.75 | 0 | 1.08 | 5.0 | 60 | 70.3 | 29.7 | 2.37 | 213 | 492 |
| 27 | 0 | 0.5 | 0.5 | 1.08 | 2.5 | 30 | 20.8 | 9.8 | 2.12 | 190 | 498 |
| 28 | 0.34 | 0.33 | 0.33 | 1.08 | 2.5 | 30 | 25.9 | 12.8 | 2.03 | 181 | 499 |
| 29 | 0.65 | 0 | 0.35 | 1.08 | 2.5 | 30 | 40 | 17.7 | 2.26 | 164 | 497 |
| 30 | 0.34 | 0.33 | 0.33 | 1.08 | 5.0 | 60 | 33.8 | 13.3 | 2.54 | 189 | 498 |
| 31 | | 0.5 | 0.5 | 1.08 | 6.3 | 45 | 36.2 | 18.0 | 2.01 | 202 | 505 |
| 32 | 0.6 | 0.4 | 0 | 1.08 | 2.5 | 45 | 27.7 | 11.9 | 2.32 | 182 | 515 |
| 33 | 0 | 1.0 | 0 | 1.14 | 5.0 | 45 | 34 | 14.4 | 2.36 | 231 | NA |
| 34 | 0 | 0 | 1.0 | 1.14 | 5.0 | 45 | 33.1 | 17.0 | 1.95 | 187 | NA |
| 35 | 0 | 0.6 | 0.4 | 1.125 | 5.0 | 45 | 30.7 | 12.9 | 2.38 | 207 | NA |
| 36 | 0.45 | 0.33 | 0.22 | 1.14 | 5.0 | 45 | 51.9 | 22.0 | 2.36 | 191 | NA |
| 37 | 1 | 0 | 0 | 1.08 | 2.5 | 30 | 31.4 | 17.2 | 1.82 | 147 | 508 |

Examples 38–60

The effect of reaction conditions on molecular weight and glass transition temperature of the polycarbonate was also

TABLE 3

| Ex No. | NaOH ($\times 10^{-6}$) moles | P3 time (min) | P3 temp (° C.) | Stirrer speed (rpm) | Mole Ratio | $M_w$ ($\times 10^3$) | End Group (%) | Frics level (ppm) | $T_g$ (° C.) |
|---|---|---|---|---|---|---|---|---|---|
| 38 | 1.0 | 30 | 300 | 40 | 1.05 | 12.2 | 69.5 | 140 | 160.5 |
| 39 | 5.0 | 30 | 300 | 40 | 1.05 | 15.8 | 42.3 | 98 | 174.0 |
| 40 | 5.0 | 45 | 300 | 40 | 1.11 | 28.6 | 65.7 | 197 | 189.5 |
| 41 | 5.0 | 45 | 300 | 40 | 1.14 | 28.8 | 90.1 | 138 | 186.5 |
| 42 | 5.0 | 30 | 320 | 40 | 1.08 | 27.9 | 58.4 | 680 | 190.0 |
| 43 | 1.0 | 30 | 310 | 40 | 1.14 | 9.7 | 82.0 | 184 | 166.5 |
| 44 | 3.0 | 60 | 300 | 40 | 1.08 | 31.2 | 53.5 | 388 | 193.0 |
| 45 | 1.0 | 60 | 320 | 40 | 1.11 | 48.1 | 61.1 | 742 | 199.0 |
| 46 | 3.0 | 30 | 320 | 40 | 1.14 | 37 | 72.1 | 331 | 195.5 |
| 47 | 1.0 | 60 | 300 | 40 | 1.11 | 25.5 | 70.7 | 177 | 181.5 |
| 48 | 5.0 | 60 | 320 | 40 | 1.08 | 44.7 | 55.9 | 1762 | 199.0 |
| 49 | 5.0 | 45 | 310 | 60 | 1.11 | 52.8 | 70.0 | 559 | 196.5 |
| 50 | 5.0 | 45 | 310 | 60 | 1.11 | 47.7 | 61.7 | 360 | 198.0 |
| 51 | 1.0 | 60 | 300 | 60 | 1.14 | 21.8 | 82.9 | 164 | 178.5 |
| 52 | 1.0 | 30 | 320 | 60 | 1.08 | 25.1 | 41.4 | 338 | 178.0 |
| 53 | 1.0 | 45 | 300 | 80 | 1.08 | 22.6 | 58.7 | 118 | 180.5 |
| 54 | 3.0 | 45 | 320 | 80 | 1.14 | 55.5 | 67.3 | 788 | 201.5 |
| 55 | 3.0 | 60 | 320 | 80 | 1.08 | 22.7 | 46.6 | 687 | 188.0 |
| 56 | 2.0 | 45 | 300 | 80 | 1.08 | 19.2 | 45.0 | 111 | 179.0 |
| 57 | 5.0 | 30 | 300 | 80 | 1.11 | 36.6 | 60.9 | 320 | 193.0 |
| 58 | 5.0 | 30 | 300 | 80 | 1.14 | 34.3 | 68.8 | 222 | 192.5 |
| 59 | 2.0 | 45 | 320 | 80 | 1.14 | 50.2 | 58.6 | 666 | 198.5 |
| 60 | 5.0 | 50 | 310 | 80 | 1.14 | 64.1 | 86.8 | 1147 | 200.0 |

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims. All Patents cited herein are incorporated herein by reference.

What is claimed is:

1. An optical disk comprising a polycarbonate layer, wherein the polycarbonate is produced using a bis (hydroxyaryl)cyclohexane selected from the group consisting of the formula:

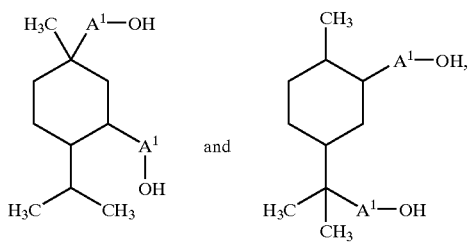

wherein each $A^1$ is independently a divalent substituted or unsubstituted radical; and at least one aromatic dihydroxy compound comonomer of the formula:

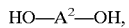

HO—$A^2$—OH, wherein $A^2$ is selected from divalent substituted or unsubstituted aromatic radicals and, wherein the polycarbonate produced comprises a weight average molecular weight of at least about 10,000, a glass transition temperature of at least about 100° C., and a percentage elongation of less than about 0.025% relative to its initial length following exposure to nitrogen with a relative humidity of about 100%, at a temperature of about 23° C., and for a duration of about 3 hours.

2. The optical disk of claim 1, wherein the polycarbonate is produced by methods selected from the group consisting of melt transesterification polymerization, interfacial polymerization, interfacial conversion bischloroformate, solid state polymerization, and thin film melt polymerization.

3. The optical disk of claim 1, wherein the bis (hydroxyaryl)cyclohexane is selected from the group consisting of:

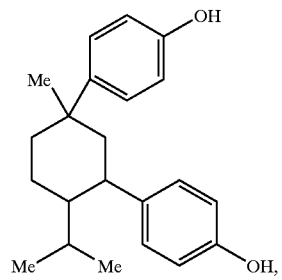

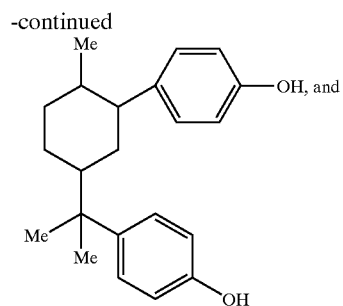

combinations comprising at least one of the foregoing bis(hydroxyaryl)cyclohexanes.

4. The optical disk of claim 1, wherein the aromatic dihydroxy compound comprises at least one compound of the formula (IV):

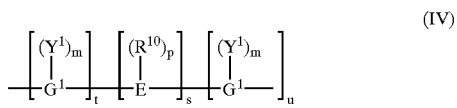

(IV)

wherein $G^1$ is an aromatic group, wherein E is at least one alkylene, alkylidene, or cycloaliphatic group, a sulfur-containing linkage, a phosphorus-containing linkage, an ether linkage, a carbonyl group, a tertiary nitrogen group, or a silicon-containing linkage, wherein $R^1$ is a hydrogen or a monovalent hydrocarbon group, wherein $Y^1$ is selected from the group consisting of a hydrogen, a monovalent hydrocarbon group, an alkenyl, an allyl, a bromine, a chlorine, nitro, wherein "m" represents any integer from and including zero through the number of positions on $A^1$ available for substitution, wherein "p" represents an integer from and including zero through the number of positions on E available for substitution, wherein "t" represents an integer equal to at least one, wherein "s" is either zero or one, and wherein "u" represents any integer including zero.

5. The optical disk of claim 4, wherein the aromatic dihydroxy compound is selected from the group consisting of 4,4'-(3,3,5-trimethylcyclohexylidene)diphenol; 4,4'-bis(3,5-dimethyl)diphenol, 1,1-bis(4-hydroxy-3-methylphenyl) cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 2,2-bis(3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol.

6. The optical disk of claim 4, wherein the aromatic dihydroxy compound comonomer is selected from the group consisting of bisphenol A, resorcinol, 4,4'-(1-decylidene)-bisphenol, 2,2-bis(3-sec-butyl-4-hydroxyphenyl)propane, and combinations comprising at least one of the foregoing.

7. The optical disk of claim 1, wherein the optical disk is selected from the group consisting of a high density digital versatile disc and a digital video rewritable formats.

8. An optical disk comprising a polycarbonate layer produced using a catalyst composition and a monomer composition, wherein the monomer composition comprises a diphenyl carbonate; a bisphenol composition, and an aromatic dihydroxy comonomer compound, wherein the aromatic dihydroxy compound comprises resorcinol, bisphenol A, 4,4'-(1-decylidene)-bisphenol, 2,2-bis(3-sec-butyl-4-hydroxyphenyl)propane, and combinations comprising at least of the foregoing aromatic dihydroxy comonomer compounds, and wherein the bisphenol composition comprises at least one bis(hydroxyaryl)cyclohexane selected from the group consisting of:

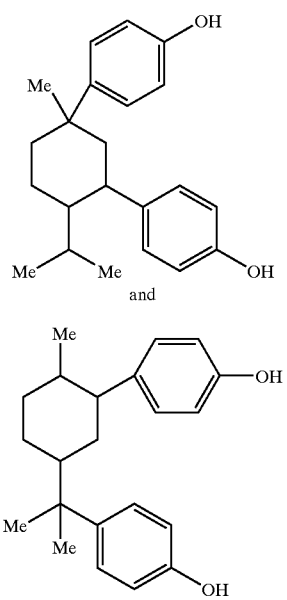

and wherein each $A^1$ is independently a substituted or unsubstituted divalent aromatic radical.

9. A display device comprising a polycarbonate protective layer, wherein the polycarbonate is produced using a bis(hydroxyaryl)cyclohexane selected from the group consisting of the formula:

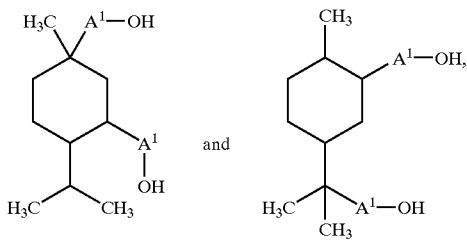

wherein each $A^1$ is independently a divalent substituted or unsubstituted radical; and at least one aromatic dihydroxy compound comonomer of the formula:

$$HO-A^2-OH,$$

wherein $A^2$ is selected from divalent substituted or unsubstituted aromatic radicals and, wherein the polycarbonate produced comprises a weight average molecular weight of at least about 10,000, a glass transition temperature of at least about 100° C., and a percentage elongation of less than about 0.025% relative to its initial length following exposure to nitrogen with a relative humidity of about 100%, at a temperature of about 23° C., and for a duration of about 3 hours.

* * * * *